US009623505B2

(12) United States Patent
Daniel et al.

(10) Patent No.: US 9,623,505 B2
(45) Date of Patent: Apr. 18, 2017

(54) METHOD AND SYSTEM OF WELDING WITH A POWER SUPPLY HAVING A SINGLE WELDING MODE

(71) Applicant: LINCOLN GLOBAL, INC., City of Industry, CA (US)

(72) Inventors: Joseph A. Daniel, Sagamore Hill, OH (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 816 days.

(21) Appl. No.: 13/798,219

(22) Filed: Mar. 13, 2013

(65) Prior Publication Data

US 2014/0263237 A1    Sep. 18, 2014

(51) Int. Cl.
*B23K 9/095* (2006.01)
*B23K 9/09* (2006.01)
*B23K 9/10* (2006.01)

(52) U.S. Cl.
CPC .............. *B23K 9/0953* (2013.01); *B23K 9/09* (2013.01); *B23K 9/1006* (2013.01); *B23K 9/1012* (2013.01); *B23K 9/1043* (2013.01); *B23K 9/1062* (2013.01)

(58) Field of Classification Search
CPC ...... B23K 9/09; B23K 9/0953; B23K 9/1006; B23K 9/1012; B23K 9/1043; B23K 9/1062

USPC ..................................................... 219/130.21
See application file for complete search history.

(56) References Cited

U.S. PATENT DOCUMENTS

| 6,075,225 A | 6/2000 | Heraly et al. | |
|---|---|---|---|
| 2004/0069759 A1* | 4/2004 | Davidson | B23K 9/091 219/130.5 |
| 2007/0056944 A1* | 3/2007 | Artelsmair | B23K 9/092 219/130.5 |
| 2011/0049116 A1* | 3/2011 | Rappl | B23K 9/1006 219/132 |
| 2012/0074115 A1* | 3/2012 | Kazmaier | B23K 9/09 219/130.51 |

FOREIGN PATENT DOCUMENTS

| EP | 1681123 A2 | 7/2006 |
|---|---|---|
| EP | 2431119 A1 | 3/2012 |

OTHER PUBLICATIONS

International Application No. PCT/IB2014/000303, International Search Report, 3 pages, Sep. 23, 2014.

* cited by examiner

*Primary Examiner* — Dana Ross
*Assistant Examiner* — James Sims, III
(74) *Attorney, Agent, or Firm* — Perkins Coie LLP (57) ABSTRACT

A welding power supply and method are provided with a single welding mode in its controller such that the power supply can change from full DCEN output to AC output to a full DCEP output without having to change welding modes.

20 Claims, 5 Drawing Sheets

METHOD AND SYSTEM OF WELDING WITH A POWER SUPPLY HAVING A SINGLE WELDING MODE

TECHNICAL FIELD

This invention relates to systems and methods for welding. More specifically, the subject invention relates to systems and methods to weld using different welding techniques but using a single welding mode.

BACKGROUND

It is generally known that welding power supplies today can be used to weld in different welding modes. For example, a power supply can be capable of welding in a DC electrode positive (DCEP) mode, a DC electrode negative (DCEN) mode, or an AC mode. Each of these modes has different advantages and disadvantages for different welding processes. Sometimes, it may be necessary to switch between welding modes during welding based on the desired welding parameters or performance. With existing power supplies this switch requires the power to switch welding modes—that is switching from one welding program to another. When this switch occurs during a welding operation there is a delay while the power supply switches modes, and this delay can cause a disturbance in the welding waveform and can result in the creation of weld spatter, or other adverse events during welding. Therefore, switching welding modes during welding can cause weld problems.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention include systems and methods of arc welding in which a single welding mode is utilized in the power supply to create a plurality of separate and distinct welding process waveforms without having to switch welding modes within the controller of the power supply.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
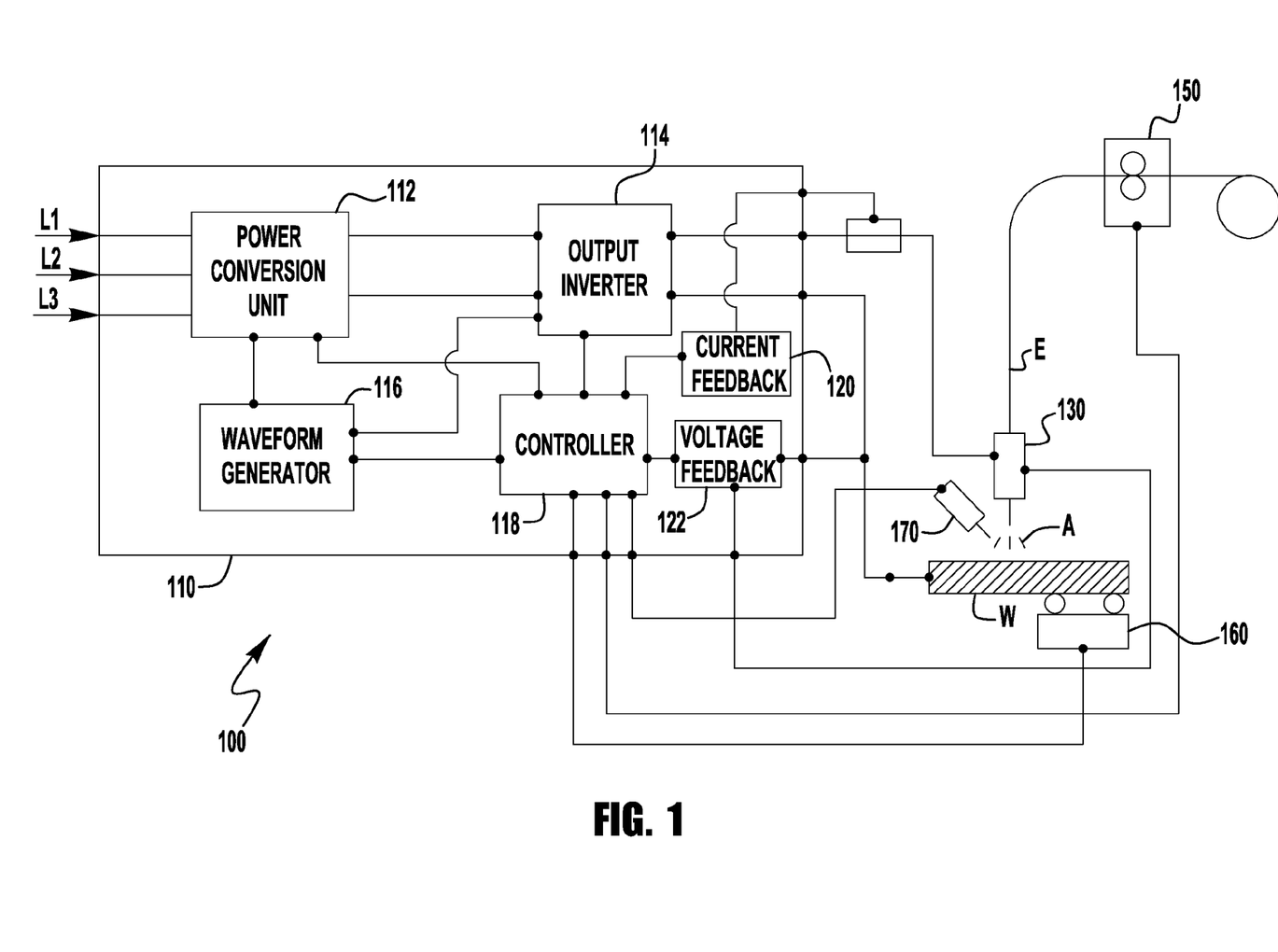
FIG. 1 is a diagrammatical representation of a welding system in accordance with an exemplary embodiment of the present invention.

FIG. 1 is an illustrative embodiment of a welding system 100 in accordance with exemplary embodiments of the present invention. The welding system contains a welding power supply 110 which delivers a welding waveform to a welding torch 130 and a workpiece W through an electrode E to generate a welding arc A. The electrode E is delivered to the welding operation via a wire feeder 150. The wire feeder 150 can be of any known construction such that it is capable of delivering the electrode E to the weld and, in some embodiments, the wire feeder 150 can adjust the wire feed speed of the electrode E based on a signal from the power supply 110—which will be discussed in more detail below.

The system 100 also contains a movement device 160 which is capable of moving either the workpiece W or the contact tip 130, or both. Such movement devices are generally known and can include a robot, a welding tractor unit, etc. In exemplary embodiments of the present invention, the movement device is capable of adjusting or changing the travel speed of the welding operation in accordance with commands received during the welding operation. As shown in FIG. 1, the commands come from the controller 118 in the power supply 110. However, in other exemplary embodiments a separate system controller can be used which is external to the power supply 110 that controls operation of components in the system 100, including the power supply 110, the wire feeder 150 and the movement device 160.

The general construction of the power supply 110 can be similar to that of known power supplies that are capable of GMAW/MIG type welding operations, so long as the power supply 110 is capable of functioning and operating as described herein. For example, the power supply 110 can be constructed similar to that of the Power Wave® type power supplies, manufactured by The Lincoln Electric Company, of Cleveland, Ohio. Of course, embodiments of the present invention are not limited to such a construction, and this is intended to be merely exemplary.

As shown in FIG. 1, the power supply 110 is capable of receiving an input signal through L1, L2 and L3. FIG. 1 depicts a 3-phase input, but other embodiments can utilize only a single phase input. The power supply 110 contains a power conversion unit 112 which is capable of receiving the input signal and outputting a signal to an output phase (such as output inverter 114) so that the output of the power supply 110 is capable of sustaining a welding arc. The power conversion unit 112 can be made up of a number of different components. For example, it can be comprised of a rectifier circuit and a buck-boost circuit which receives the rectified signal and outputs a constant voltage to the output inverter 114. Of course in other exemplary embodiments, the output inverter 114 can be a chopper, or any other type of output circuit that is capable of working with the power conversion unit 112 to output a welding signal. The power supply 110 also contains a waveform generator 116 which is a circuit which aids in controlling the output of at least one of, or both, of the power conversion unit 112 and the output inverter 114 to provide the desired welding waveform to be used to generate the arc A. For example, the waveform generator 116 can be used to generate a desired current waveform used to create and maintain the arc A during welding, coupled with one or both of the power conversion unit 112 and the output inverter 114 (or whatever output component is utilized). In addition, the power supply has a controller 118, which can be any type of CPU or processor-type device capable of controlling functions and operations of the power supply 110. Such controllers are generally known. In exemplary embodiments, the controller received feedback from a current feedback circuit 120 and a voltage feedback circuit 122 which provide current and voltage feedback (respectively) from the welding arc A during a welding operation. With this feedback, the controller 118 is able to adjust and optimize the performance of the power supply 110 to provide the desired output. This will be discussed further below.

As shown in FIG. 1, in some embodiments, the controller 118 is also coupled to a wire feeder 150 which allows the controller to receive feedback from the wire feeder 150 as well as control the operation of the wire feeder 150, such as wire feed speed, during a welding operation.

In exemplary embodiments of the present invention, the controller 118 either contains or is coupled to a memory device which stores information for the operation of the power supply. For purposes of the present discussion, the controller 118 will be considered to be a controller system which contains processing capabilities as well as storage abilities. In known power supplies, the controller 118 stores information related to the various welding modes capable of being utilized by the power supply for welding operations. Power supplies in accordance with embodiments of the present invention also use the controller 118 to store information related to welding, which will be further described below.

For purposes of the present application a welding mode is a program containing starting logic, steady state logic and ending logic, and various data points that produces a welding output waveform for a given welding process. For example, a DCEP welding mode is a program containing logic and data points for starting, producing and ending a welding output waveform which has the characteristics of a DCEP waveform.

Power supplies use various stored welding modes in the controller 118 to give the power supply flexibility to use different welding waveforms for different welding operations. For example, some exemplary welding processes, which use different waveforms, are DCEP, DCEN, pulse welding, AC welding, surface tension transfer (STT) welding, etc. Each of these processes use different waveforms, that is waveforms that have different profiles. For example, a pulse welding waveform has a different profile than a DCEP welding waveform, etc. In known systems, each of these welding processes utilizes a separately stored welding mode within the controller 118 for their implementation. When only a single welding process is needed this is of little consequence as the appropriate welding process, and thus mode, is selected at the beginning of the welding operation and is maintained throughout the welding process. However, sometimes it is desirable, or necessary, to change welding waveforms during the welding process. For example, to control heat input into a weld it may be needed to change from a DCEP to a DCEN waveform to change from a DC to AC waveform, or vice-versa. When this is done in known power supplies the controller 118 must switch welding modes/programs so that the appropriate data points or set points are utilized for the appropriate waveform. This switching can be initiated either by the user or by the controller 118 based on the programmed or desired output. Because this switching operation can take as long 0.1 s it can result in detrimental performance and adverse effects on the weld quality. For example, when transitioning from one welding mode to another, the ending logic of one welding mode must be initiated before the starting logic of a subsequent waveform can be started. Therefore for a traditional welding mode transition both ending and starting logic must be utilized before a new welding mode can be started. This can be detrimental when the transition occurs during a welding process.

Figure 2A:
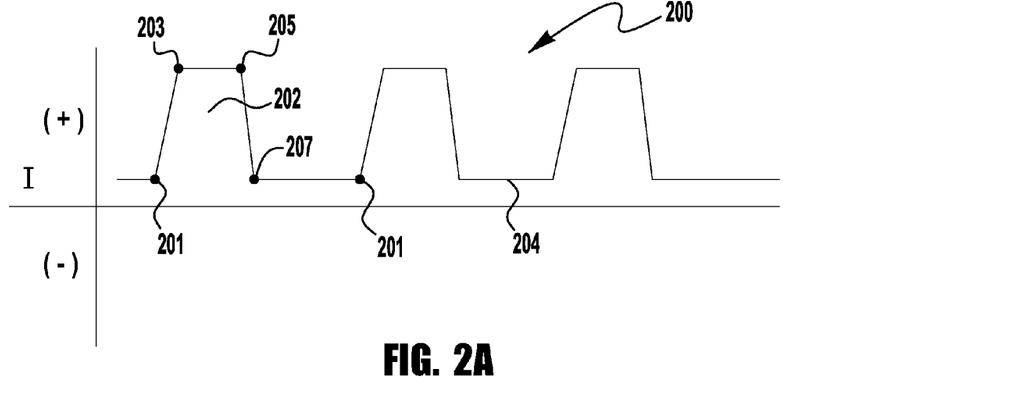
FIGS. 2A to 2C are diagrammatical representations of various different welding waveforms.
Figure 2B:
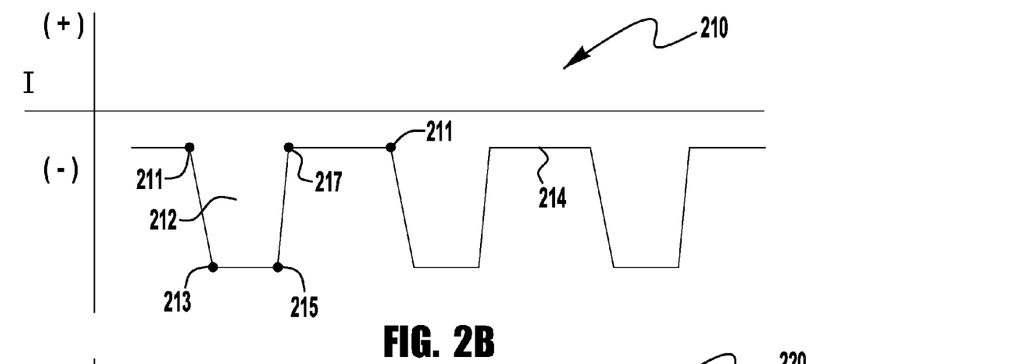
Figure 2C:
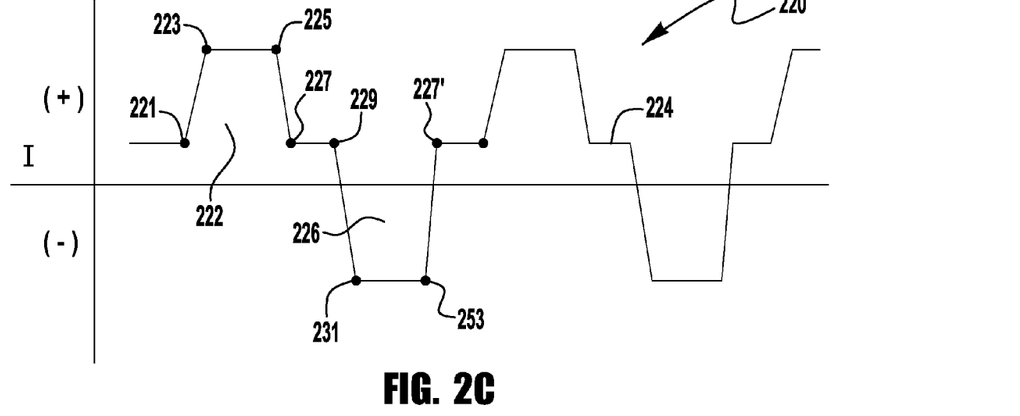

FIGS. 2A through 2C depict exemplary welding waveforms, each of which would have a separate and distinct welding mode in known power supplies. FIG. 2A depicts a DCEP welding waveform 200 which has a plurality of current pulses 202 and a background current 204. As shown the entire waveform has a positive polarity. Also, to create this waveform a welding mode would utilize a plurality of discrete data points which the controller 118 and the waveform generator 116 would utilize to create a DCEP waveform. FIG. 2A shows exemplary data points which could be used. For example, the DCEP mode could use a data point 201 which indicates the beginning of a pulse 202, a peak current level data point 203 which would indicate that each pulse 202 has a peak current level at point 203, a peak current duration data point 205 which would indicate the time or duration of the peak current level and a background current data point 207 which indicates the level at which the waveform is to be maintained for a background current level 204. Each of these data points could be used by the controller 118 to generate a DCEP welding waveform by the power supply. Of course, other data points could be utilized to generate a DCEP waveform, and the above are intended only to be exemplary. Thus, the above data points are only shown to represent a set of exemplary data points that are used within a program/mode to create a DCEP waveform. The user and/or the controller 118 can then adjust the positioning of some of these data points as waveform set points for a specific welding operation, but the fundamental welding process will be maintained. For example, a user could adjust the values of the peak current, the peak duration, the frequency (time between data points 201), etc. to achieve desired performance. However, within a given single welding mode/program the relative data points will remain unchanged and the output of the power supply will always be a DCEP so long as the DCEP welding mode is being utilized.

FIGS. 2B and 2C are similar representations as shown in FIG. 2A, except that FIG. 2B is a DCEN waveform using pulses 212. In FIG. 2B the DCEN waveform 210 uses the data point 211 to indicate the beginning of a pulse 212, a peak current level data point 213 which would indicate that each pulse 212 has a peak current level at point 213, a peak current duration data point 215 which would indicate the time or duration of the peak current level and a background current data point 217 which indicates the level at which the waveform is to be maintained for a background current level 214. Each of these data points could be used by the controller 118 to generate a DCEN welding waveform by the power supply. As with FIG. 2A, these data points are intended to be exemplary and other data points can be utilized in any given mode/program to create a DCEN type waveform.

FIG. 2C depicts an exemplary AC welding waveform 220 having both positive 222 and negative 226 pulses, and another set of data points which can be used in a welding mode by the controller 118 to create the waveform 220. For example, the data point 221 indicates the beginning of a positive pulse 222, a peak current level data point 223 which would indicate that each positive pulse 222 has a peak current level at point 223, a positive peak current duration data point 225 which would indicate the time or duration of the positive peak current level 223 and a positive background current data point 227 which indicates the level at which the waveform is to be maintained for a background current level 224. Also, the data point 229 can be used to indicate when it is desired to change from a positive polarity to a negative polarity to create the negative pulse 226. The mode uses the data point 231 to indicate the peak current level for the negative pulse 226 and the duration of the negative pulse 226 is determined by data point 233, after which the data point 227' is used again to define the background current level in the positive polarity. Each of these data points could be used by the controller 118 to generate an AC welding waveform by the power supply. Of course, other data points could be utilized to generate an AC waveform, and the above are intended only to be exemplary.

As explained earlier, these data points can then be adjusted to create waveform set points for a given welding operation. That is, their relative positioning can be adjusted to set peak current levels, frequencies, background current levels, etc. for a given welding operation, but the data points will remain such that the waveform will remain a distinct waveform as dictated by the distinct data points in the welding mode/program. Further, as explained above, in known welding systems each of the welding waveforms shown in FIGS. 2A through 2C would have a separate and distinct welding mode/program within the controller 118 and thus it would be necessary to switch between welding modes when a change in waveform was desired.

Embodiments of the present invention avoid the need to switch between separate welding modes (for example, switching between DCEP, AC and DCEN) by utilizing a single welding mode/program which is capable of changing from different welding types (e.g., DCEP, AC and DCEN) without needing to change the welding mode in the controller 118.

Figure 3A:
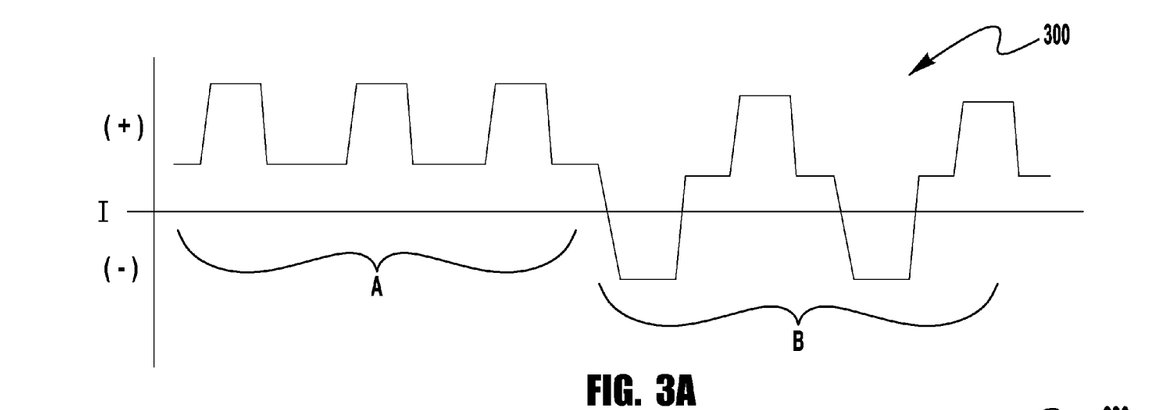
FIGS. 3A and 3B are diagrammatical representations of welding waveforms that can be created by exemplary embodiments of the present invention.
Figure 3B:
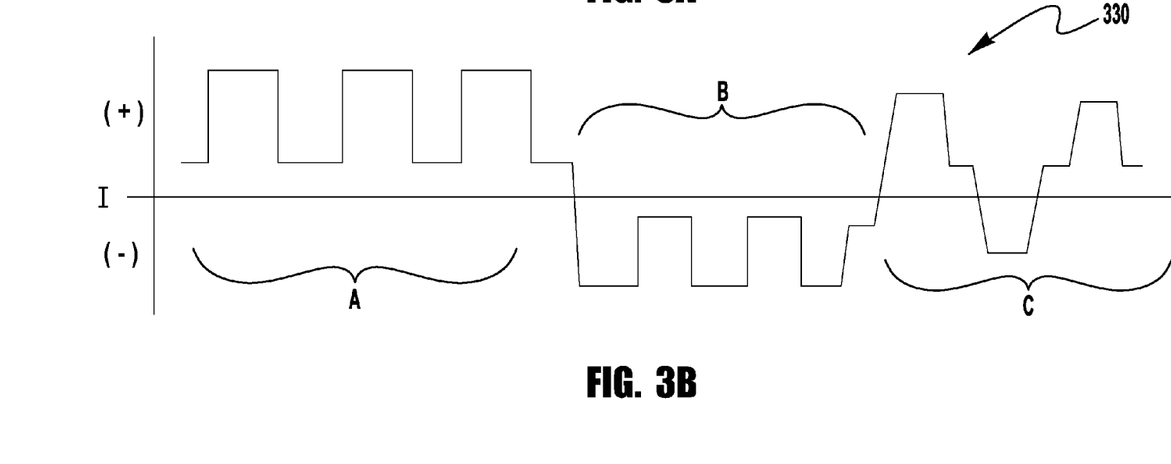

Turning now to FIGS. 3A and 3B, exemplary waveforms which can be created with embodiments of the present invention are shown. FIG. 3A shows a welding output or waveform 300 having a DCEP portion A and an AC portion B. That is, the waveform 300 is a combination of the waveforms 200 and 220 shown in FIGS. 2A and 2C, respectively. In traditional power supplies it would have been necessary to switch welding modes in the controller 118 to transition from portion A to portion B which is a distinct welding waveform. However, because embodiments of the present invention use a single welding mode the transition from waveform portion A to waveform portion B does not require the controller 118 to switch welding modes, but rather only the transition of data points used to control the welding output. Thus, embodiments of the present invention can make a smooth transition from one distinct welding process to another without any adverse effects.

Similarly, FIG. 3B shows another exemplary 330 waveform which is using three distinct welding processes. A first portion A of the waveform 330 is a DCEP portion, similar to that shown in FIG. 2A, the second portion B of the waveform 330 is a DCEN portion, similar to that shown in FIG. 2B, while the last portion C is an AC waveform, similar to that shown in FIG. 2C. Again, like FIG. 3A, the waveform 330 is generated out of a single welding mode within the controller 118 such that there is no lag in the transition between the portions A and B, and B and C.

It should be noted that although the above discussions refer to examples using DCEP, DCEN and AC welding processes, other welding distinct welding processes can be used and incorporated into a single welding mode as contemplated herein. Examples of other distinct welding processes include, but are not limited to, surface tension transfer (STT), pulse, etc. Further, embodiments of the present invention are not limited to specific or distinct types of welding and can be used for any of GMAW, GTAW, sub-arc, etc.

For purposes of the present application it should be understood that each separate and distinct welding process is a separate, definable welding process having a set of operational data points which are different than another separate and distinct welding process, where the data points define the general profile of the waveform to be generated. For example, as shown in FIGS. 2A through 2C, each of the waveforms 200, 210, and 220 have distinct data points which define the overall profile of the waveforms. Again, the exact magnitude of the data points during welding can be adjusted for a given welding operation, but the data points represent the general profile of the welding waveform. That is, the data points in FIG. 2A define a pulse DCEP welding process profile, the data points in FIG. 2B define a pulse DCEN welding process profile, and the data points in FIG. 2C define an AC welding process profile. Each of these welding profiles is distinct from each other.

It should be also noted that embodiments of the present invention may have data points that are similar for a number of different welding process data point modules within the single mode, but the entirety of the data points may not overlap between waveforms. For example, each of the waveforms 200 (DCEP) and 220 (AC) have a data point which identifies a peak current level for a positive pulse— 203 and 223, respectively. The fact that these data points overlap between the welding processes does not change the fact that the process in FIG. 2A is separate and distinct from the process in FIG. 2C, as they do not employ the same data points in each respective waveform.

Thus, embodiments of the present invention allow the controller 118 to contain a single welding mode which is capable of creating a welding waveform for multiple distinct welding processes without having the need to change welding modes within the controller 118.

In another exemplary embodiment of the present invention, the single welding mode/program stored in the controller 118 contains a single set of data points which are capable of collectively defining all of the possible welding processes that can be implemented with the single welding mode. Thus, as the welding operation transfers from one welding process to another only the appropriate data points are utilized to create the desired waveform.

Figure 4:
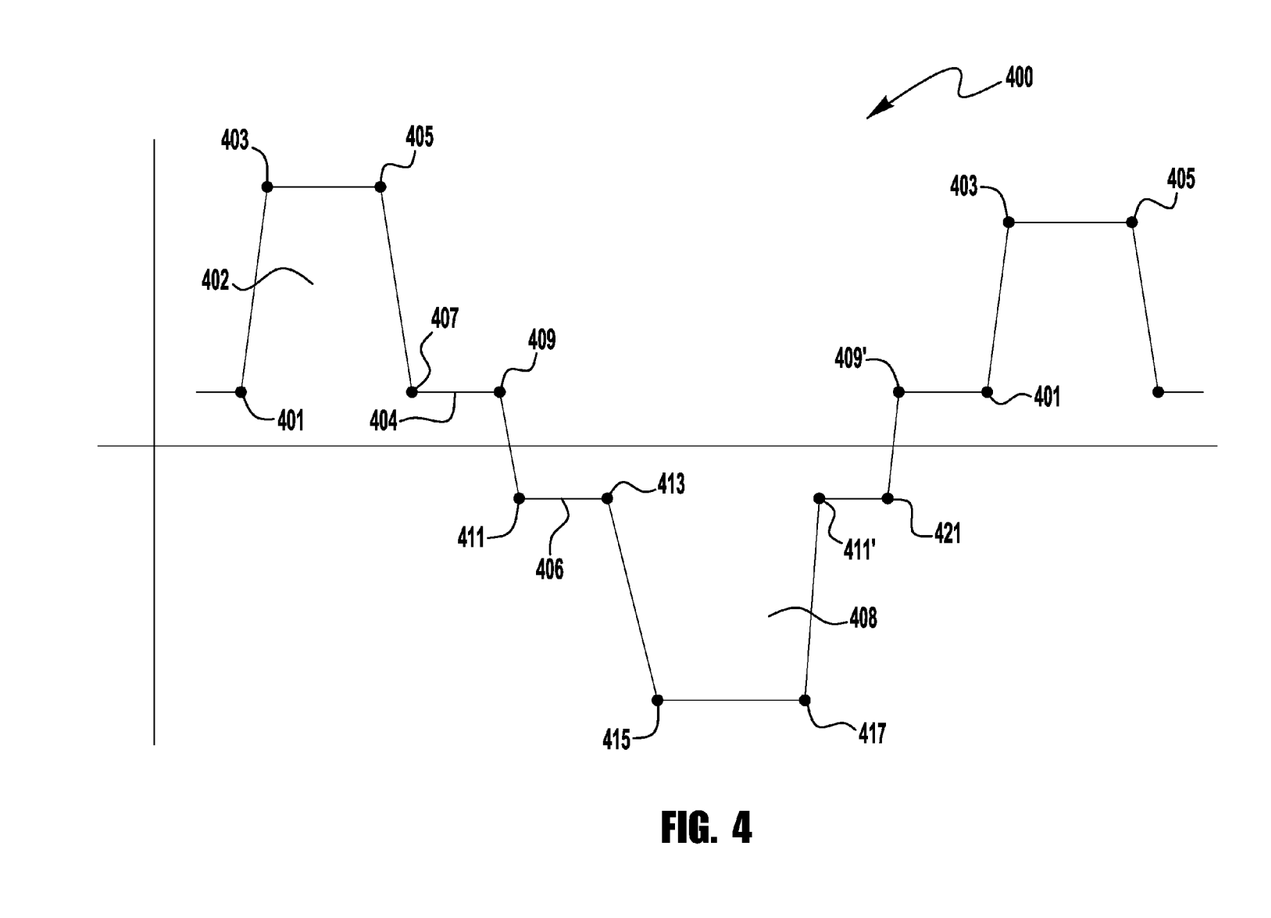
FIG. 4 is a diagrammatical representation of a waveform profile showing exemplary data points for a single welding mode in accordance with an exemplary embodiment of the present invention.

FIG. 4 depicts an exemplary grouping of data points, and a corresponding welding waveform, that can be stored in a single welding mode/program within the controller 118. This collection of data points can be used to create multiple distinct welding process waveforms. Specifically, as shown in FIG. 4 the waveform 400 is an AC pulse waveform having a DC and an AC portion, and the single welding mode would contain all of the data points shown so that the controller 118 can create the waveform 118 as shown. Specifically, the data point 401 identifies the beginning of a positive pulse 402, the data point 403 defines the peak current for the positive pulse 402 and the point 405 defines the duration of the peak current for the pulse 402. The data point 407 defines the positive background current level 404 and the data point defines the desired switch point from positive polarity to negative. The data point 411 defines the negative background current level 406 and the data point 413 defines the beginning of a negative current pulse 408. Data point 415 defines the peak current level for the negative pulse 408 and data point 417 defines the duration of the peak current for the negative pulse 408. Data point 411' defines the negative background current level after the pulse 408 and data point 421 defines the point at which it is desired to switch from negative polarity to positive polarity. Data point 409' defines the positive background current 408, and as described above data point 401 described the beginning of another positive pulse 402. Thus, to generate a welding output that resembles the waveform 400 the controller 118 will use all of the described data points in the single welding mode within the controller 118. By employing all of these data points a welding output of the shown profile can be generated. Again, of course the exact magnitude used for the output (peak current, frequency, background current, etc.) will be determined by the user and/or controller to allow the power supply to output the desired signal.

However, when it is desired to change welding processes, the controller 118 can change, zero, or null any one or some of the data points in the welding mode so that they are no used to create the welding output, thus changing the welding output to a different welding process without changing the welding mode/program.

For example, if the controller 118 desires to change from the welding output shown in FIG. 4 to a DCEP output the controller 118 can simple zero or nullify the data points 409, 411, 413, 415, 417, 411', 421 and 409'. This will result in the controller 118 only using the data points 401, 403, 405, and 407 to create the welding output. The utilization of these data points will result in a DCEP waveform similar to that shown in FIG. 2A. Therefore, by ignoring a subset of data points within the single welding mode the controller 118 can change between distinct welding processes without switching welding modes within the controller 118.

Thus, using various subsets of the data points shown in FIG. 4, the single welding mode in the controller 118 can create numerous distinct welding process profiles, such as those shown in FIGS. 2A through 3B, without having to change welding modes. That is, the controller 118 need only "activate" and "deactivate" various data points within the single welding mode to create various distinct welding processes, which can be done rapidly without having to change welding modes/programs.

Figure 5A:
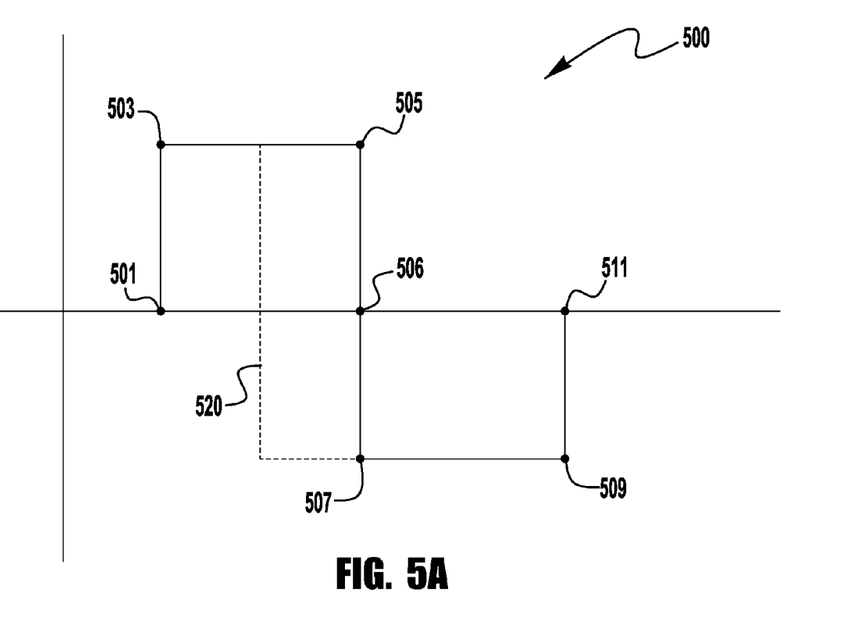
FIG. 5A is a diagrammatical representation of another waveform in accordance with an exemplary embodiment of the present invention.

This can be accomplished in a number of ways relative to the programming of the controller 118. For example, in FIG. 5A another exemplary waveform 500 is shown utilizing a plurality of a control data points as shown, similar to the data points shown in the figures previously discussed. In the waveform 500, the data point 501 represents the beginning of a positive pulse, point 503 represents a peak current for a positive pulse, point 505 represents the end of a positive peak duration, point 506 represents the positive to negative transition, point 507 represents the peak current of the negative of the pulse, point 509 represents the end of the negative peak duration, and point 511 represents the end of the negative portion of the waveform 500. As explained above the value of each of these points can be adjusted within the welding mode based on the input information, allowing for the creation of multiple different types of waveforms—during welding—without changing welding modes. For example, during welding a user can alter the input parameters such that the power supply controller adjusts each of the data points to obtain the desired welding output, where the data points can be changed such that the welding waveform can transition from 100% DCEP to 100% DCEN, and any AC ratio in between, without changing welding modes within the controller. For example, as shown in FIG. 5A, the waveform 500 can be transition to another waveform 520 having a short positive duration without changing the welding mode. In fact, the waveform can be transitioned into an out of AC without changing the welding mode.

Figure 5B:
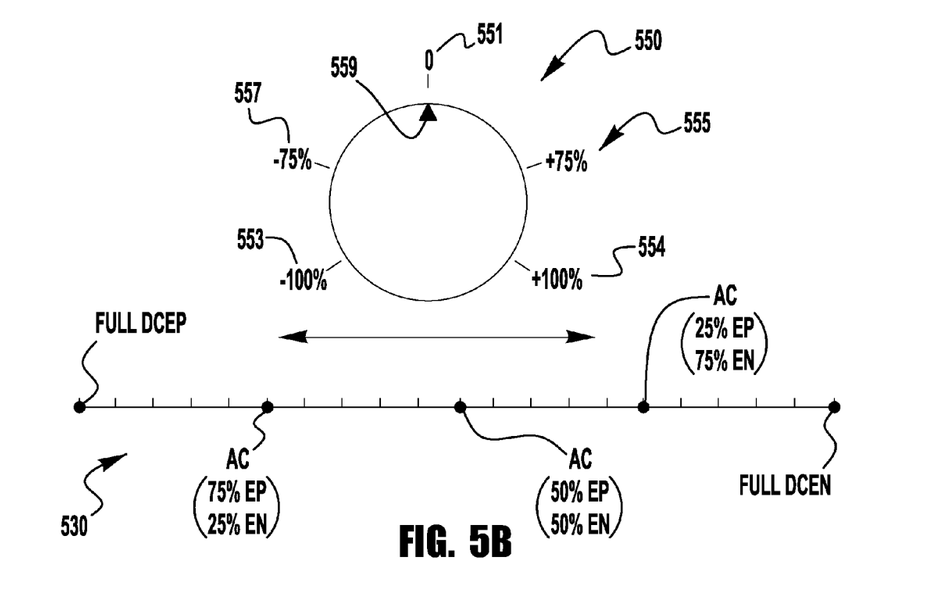
FIG. 5B is a diagrammatical representation of a control methodology of an embodiment of the present invention.

FIG. 5B depicts an exemplary control input knob 550 and a graphical line 530 representing the percentage polarity of the waveform. For example, in an exemplary embodiment of the present invention, the control knob 550 (or any other user input) can be utilized. In exemplary embodiments, during the welding process—that is after the welding waveform starting logic has been implemented—the user can adjust the knob 550 to control output of the power supply without changing the welding mode. For example, at the beginning of the welding operation it may be desirable to start with an AC waveform where 50% of the cycle is EP and 50% of the cycle is EN. For this output the knob 550 is positioned such that the indicator 559 is at the "0" mark 551. At this setting the data points in the welding mode (for example the data points in FIG. 5A) are set such that the positive and negative peak durations are the same, like the waveform 500 in FIG. 5A. But, during welding, it may be desirable to change that ratio (for example, to adjust heat input) and so the user can adjust the knob 550 to adjust the wave balance of the AC waveform. The user can move the knob 550 to the position 557, where the waveform will be 75% EN and 25% EP, or position 555 where the waveform will be 75% EP and 25% EN. Further, the user can adjust the knob 550 to position 553 which would make the waveform 100% negative (DCEN) or to position 554 which would make the waveform 100% positive (DCEP). In exemplary embodiments, the control methodology can allow the user to adjust knob 550 such that any desired wave balance ratio can be achieved anywhere in between full DCEP and full DCEN, and this can be done—while welding—without changing the welding mode in the controller. This is done by adjusting the parameters associated with each of the data points for generating the waveform (described above).

For example, in an exemplary embodiment of the present invention, the user input (e.g., the knob 550) will control the duration data points, for example the data points related to the duration of the peak current levels (e.g., data points 503, 505, 507 and 509 in FIG. 5A). That is, when the knob 550 is positioned for a 50/50 AC waveform, the data points are adjusted such that the positive and negative pulses have the same peak current time. For example, when the knob 550 is at position 551 each of the peak durations will be set at the same peak time of 5 ms. Then, as the knob 550 is adjusted to favor one polarity or the other, the data points for the peak durations are adjusted appropriately. For example, when the knob is adjusted to the position 553 the positive peak duration data points are adjusted so that the positive peak time is 0 ms—which means that there will be no positive pulse and the waveform will be full DCEN. Similarly, when the knob is adjusted to the position 554 the negative peak duration data points are adjusted so that the negative peak time is 0 ms—which means that there will be no negative pulse and the waveform will be full DCEP. Thus, during a welding operation, the user can fully adjust the output waveform from DCEP to DCEN and any AC wave balance in between. In such an embodiment, the user can adjust the peak duration of each of the negative and positive pulses anywhere between 0 ms and full DCEN or full DCEP.

In addition to the foregoing, exemplary embodiments of the present invention allow for the same adjustment of other parameters of the welding waveform using the data points as discussed above. For example, a user can also adjust any one, or all of, peak duration, peak amplitude, background amplitude, frequency, current ramp rates (increasing or decreasing) using similar methodology as described above. Various user input controls can be used to control any of these parameters in a similar way as described above. Again, this capability allows a user to adjust these parameters, and thus change the waveform, without the controller to execute an ending logic of one welding mode and a starting logic of another welding mode. A single welding mode is used in which the welding mode data points or parameters are adjusted during welding with no interruption in welding triggered by the changing of a welding mode.

As described above, a user can utilize a user input to adjust a peak current duration while welding such that the user can change from an AC waveform to a DCEN waveform to a DCEP waveform, with any wave balance in between without changing welding modes. However, in some exemplary embodiments a duration threshold parameter is utilized by the controller to prevent the waveform from being adjusted to a waveform profile that exceeds the operational abilities of the power supply. That is, the controller utilizes a threshold parameter that below which the waveform will be directly changed to full DCEN or DCEP. In exemplary embodiments of the present invention the threshold parameter will be a peak current duration threshold parameter, below which the controller converts the waveform to full DCEP or DCEP. This parameter is utilized by the controller to prevent the user from adjusting the waveform to have characteristics that could not be effectively or efficiently performed by the power supply. In some exemplary embodiments of the present invention the peak current duration threshold parameter is in the range of 0.8 to 2 ms. In other exemplary embodiments, the peak current duration threshold is 1 ms. For example, if the peak current duration threshold is set at 1 ms, when a user is adjusting the waveform (for example using the knob 550) such that the data points for the waveform will create a positive peak current that is less than 1 ms, the controller automatically makes the waveform a full DCEN waveform. This prevents the user from creating a waveform that can not be effectively performed by the power supply. Similarly, when the user adjusts the waveform such that the data points for the waveform will create a negative peak current that is less than 1 ms, the controller automatically makes the waveform a full DCEP waveform.

As explained above, any number of data points and parameters can be used in the single welding mode in the controller to allow a user adjust a waveform during welding, and a number of user inputs can be provided which allows the user to adjust these data points while welding. This flexibility can allow a welding operation to change from using a full DCEN waveform to AC to a full DCEP waveform without changing welding modes in the controller, without utilizing any starting or ending logic from a welding mode to switch between these welding waveforms.

Additionally, this flexibility allows a user to change different welding waveform types, such as pulse, STT, etc., without changing welding modes.

It should be noted that the discussion above has focused on the use of a single welding mode, and changing the waveform with that mode during steady state welding. Of course, the single welding mode discussed above will also contain starting and ending logic to end a welding process, consistent with starting and ending logic which is known. Similar to the discussion above, the starting and ending logic can utilize control logic and data points that can be adjusted consistent with the welding process or waveform being utilized at the beginning or ending of the welding process. Stated differently, the single welding mode will have sufficient flexibility to be able to start in a DCEN mode, an AC mode, or a DCEP mode—whichever is selected to start the welding process. Similarly, the single welding mode will have ending logic with the flexibility to end the welding process from any of a DCEN, AC or DCEP welding process. For example, in exemplary embodiments, during operation the controller sets the various data points and logic for starting and ending logic based on the user input setting (for example the knob 550) at the beginning and ending of the process, respectively. The adjustment of the data points for the starting and ending process is similar to that discussed above with respect to the steady state welding operation.

These above described embodiments, as well as others consistent with the scope described herein result in controlling and outputting a welding waveform that is made up of different waveform portions having distinct welding profiles, for distinct welding processes, without having to change welding modes while welding. Such control provides significant advantages over known control methodologies using multiple welding modes, which could increase the potential for weld defects and anomalies while welding While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the above description.

The invention claimed is:

1. A welding power supply, comprising:
   a welding output circuit configured to output a plurality of different welding waveforms, where at least some of said plurality of different welding waveforms include a DC electrode negative welding waveform, an AC welding waveform and a DC electrode positive welding waveform; and
   a welding controller coupled to said welding output circuit, said welding controller configured to execute a welding mode to output a welding waveform from said plurality of different welding waveforms;
   wherein said welding mode includes a starting logic, a steady state logic, an ending logic, and a plurality of data points that define said welding waveform, and
   wherein said welding controller is configured such that, during welding in response to a request to change said welding waveform, said controller changes from said welding waveform to another welding waveform of said plurality of different welding waveforms by changing at least some of said plurality of data points, without said controller changing to a different welding mode and without initiating anyone of the starting or ending logic present in said controller.

2. The welding power supply of claim 1, wherein said controller controls said welding output circuit based on a threshold parameter, where when said threshold parameter is exceeded said controller automatically changes said welding waveform to said another welding waveform.

3. The welding power supply of claim 2, wherein said threshold parameter is a peak current duration threshold parameter.

4. The welding power supply of claim 2, wherein said threshold parameter is a peak current duration threshold parameter in a range of 0.8 to 2 ms, and
wherein when a peak current duration of said welding waveform is adjusted to be between 0.8 to 2 ms, said controller changes said output of said welding output circuit from said welding waveform to said another welding waveform.

5. The welding power supply of claim 2, wherein said threshold parameter is a peak current duration threshold parameter that is 1 ms, and
wherein, when a peak current duration of said welding waveform is adjusted to be below 1 ms, said controller changes said output of said welding output circuit from said welding waveform to said another welding waveform.

6. The welding power supply of claim 1, wherein, during welding in response to said request to change said welding waveform, at least some of said plurality of data points are changed by said controller to change said welding waveform from anyone of said DC electrode negative welding waveform, said AC welding waveform and said DC electrode positive welding waveform, to any other one of said DC electrode negative welding waveform, said AC welding waveform and said DC electrode positive welding waveform without said controller changing to a different welding mode and without initiating anyone of the starting or ending logic present in said controller.

7. The welding power supply of claim 1, wherein said controller changes at least some of said plurality of data points based on a user input during said welding.

8. The welding power supply of claim 1, wherein at least some of said plurality of data points control at least one of a duration of a peak current, a frequency, a peak current level, a background current level, and a current ramp rate of said welding waveform.

9. The welding power supply of claim 1, wherein at least some of said plurality of data points control a duration of a peak current and, during welding in response to said request to change said welding waveform, the controller adjusts the duration of any peak current to 0ms without changing from said welding mode.

10. The welding power supply of claim 1, wherein at least some of said plurality of data points control a duration of a peak current and, during welding in response to said request to change said welding waveform, the controller adjusts the duration of any peak current to change said welding waveform from anyone of said DC electrode negative welding waveform, said AC welding waveform and said DC electrode positive welding waveform, to any other one of said DC electrode negative welding waveform, said AC welding waveform and said DC electrode positive welding waveform without said controller changing to a different welding mode and without initiating anyone of the starting or ending logic present in said controller.

11. A method of welding, comprising:
outputting a welding waveform from a welding output circuit which is capable of outputting a plurality of different welding waveforms, where at least some of said plurality of different welding waveforms are a DC electrode negative welding waveform, an AC welding waveform and a DC electrode positive welding waveform; and
executing a welding mode to control said welding output circuit to output a welding waveform from said plurality of different welding waveforms;
wherein said welding mode includes a starting logic, a steady state logic, and ending logic, and a plurality of data points that define said welding waveform, and
wherein said executing a welding mode to control said welding output circuit includes, during welding in response to a request to change said welding waveform, changing said welding waveform to another welding waveform of said plurality of different welding signals by changing at least some of said plurality of data points, without changing to a different welding mode and without initiating anyone of the starting or ending logic.

12. The welding method of claim 11, further comprising automatically changing said welding waveform to said another welding waveform when a threshold parameter is exceeded.

13. The welding method of claim 12, wherein said threshold parameter is a peak current duration threshold parameter.

14. The welding method of claim 12, wherein said threshold parameter is a peak current duration threshold parameter in a range of 0.8 to 2 ms, and
the method further comprises changing from said welding waveform to said another waveform when a peak current duration of said welding waveform is adjusted to be between 0.8 to 2 ms.

15. The welding method of claim 12, wherein said threshold parameter is a peak current duration threshold parameter that is 1 ms, and
wherein the method further comprises changing from said welding waveform to said another waveform when a peak current duration of said welding signal is adjusted to be below 1 ms.

16. The welding method of claim 11, wherein, during welding in response to said request to change said welding waveform, at least some of said plurality of data points are changed to change said welding waveform from anyone of said DC electrode negative welding waveform, said AC welding waveform and said DC electrode positive welding waveform, to any other one of said DC electrode negative welding waveform, said AC welding waveform and said DC electrode positive welding waveform without chancing to a different welding mode and without initiating anyone of the starting or ending logic.

17. The welding method of claim 11, wherein said changing at least some of said plurality of data points is based on a user input during said welding.

18. The welding method of claim 11, wherein at least some of said plurality of data points control at least one of a duration of a peak current, a frequency, a peak current level, a background current level, and a current ramp rate of said welding waveform.

19. The welding method of claim 11, wherein at least some of said plurality of data points control a duration of a peak current and, during welding in response to said request to change said welding waveform, adjusting the duration of any peak current to 0ms without changing from said welding mode.

20. The welding method of claim 11, wherein at least some of said plurality of data points control a duration of a peak current and, during welding in response to said request to change said welding waveform, adjusting the duration of any peak current to change said welding waveform from anyone of said DC electrode negative welding waveform, said AC welding waveform and said DC electrode positive welding waveform, to any other one of said DC electrode negative welding waveform, said AC welding waveform and said DC electrode positive welding waveform without changing to a different welding mode and without initiating anyone of the starting or ending logic.

* * * * *